US008540199B2

(12) United States Patent
Ke

(10) Patent No.: US 8,540,199 B2
(45) Date of Patent: Sep. 24, 2013

(54) SPEAKER ASSEMBLY WITH ROTARY FASTENING MECHANISM

(75) Inventor: Ming-Shiang Ke, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 107 days.

(21) Appl. No.: 12/897,804

(22) Filed: Oct. 5, 2010

(65) Prior Publication Data

US 2011/0186705 A1 Aug. 4, 2011

(30) Foreign Application Priority Data

Jan. 29, 2010 (TW) .............................. 99102568 A

(51) Int. Cl.
*A47B 96/00* (2006.01)
(52) U.S. Cl.
USPC .............. 248/224.8; 248/222.13; 248/220.21; 248/225.11; 381/386; 181/199
(58) Field of Classification Search
USPC .............. 248/224.8, 220.21, 289.11, 292.11, 248/226.11, 222.13, 225.11, 221.11; 381/395, 381/386, 388, 333, 306, 392, 353, 354, 368; 181/199
See application file for complete search history.

(56) References Cited

U.S. PATENT DOCUMENTS

| | | | | |
|---|---|---|---|---|
| 3,575,370 A | * | 4/1971 | Morris et al. ................ | 248/201 |
| 5,048,089 A | * | 9/1991 | Moore ........................... | 381/87 |
| 5,699,438 A | * | 12/1997 | Smith et al. .................... | 381/386 |
| 5,852,545 A | * | 12/1998 | Pan-Ratzlaff ............ | 361/679.23 |
| 6,341,753 B1 | * | 1/2002 | Cheng .......................... | 248/200 |
| 6,606,392 B2 | * | 8/2003 | Ogawa .......................... | 381/386 |
| 6,639,793 B2 | * | 10/2003 | Lien et al. ................ | 361/679.23 |
| 6,760,460 B1 | * | 7/2004 | Jeon .............................. | 381/388 |
| 6,990,212 B2 | * | 1/2006 | Kambe .......................... | 381/386 |
| 7,134,635 B2 | * | 11/2006 | Burriel et al. ................. | 248/500 |
| 7,221,772 B2 | * | 5/2007 | Evenisse et al. ............. | 381/386 |
| 7,239,715 B2 | * | 7/2007 | Maekawa et al. ............ | 381/389 |
| 7,364,009 B2 | * | 4/2008 | Sperle et al. .................. | 181/150 |
| 7,676,045 B2 | * | 3/2010 | Merrey et al. .................. | 381/87 |
| 7,717,227 B2 | * | 5/2010 | Kusano ......................... | 181/150 |
| 7,746,627 B2 | * | 6/2010 | Yamaguchi et al. ........ | 361/679.2 |
| 7,817,813 B2 | * | 10/2010 | Kang et al. .................... | 381/333 |
| 7,894,182 B2 | * | 2/2011 | Wang et al. ............. | 361/679.23 |
| 7,995,786 B2 | * | 8/2011 | Yu .................................. | 381/386 |
| 8,126,186 B2 | * | 2/2012 | Kameoka ...................... | 381/388 |
| 8,224,014 B2 | * | 7/2012 | Sprinkle ....................... | 381/386 |
| 8,254,623 B2 | * | 8/2012 | Okumura ...................... | 381/388 |
| 2005/0100187 A1 | * | 5/2005 | Yang ............................. | 381/386 |
| 2006/0280328 A1 | * | 12/2006 | Nakagawa .................... | 381/388 |
| 2007/0075202 A1 | * | 4/2007 | Gordon .................... | 248/289.11 |
| 2009/0116679 A1 | * | 5/2009 | Kameoka ...................... | 381/388 |

OTHER PUBLICATIONS

Office action mailed on Apr. 3, 2013 for the China application No. 201010106068.X, p. 3 line 3~44 and p. 4 line 1.

* cited by examiner

*Primary Examiner* — Terrell McKinnon
*Assistant Examiner* — Monica Miller
(74) *Attorney, Agent, or Firm* — Winston Hsu; Scott Margo

(57) ABSTRACT

A speaker fastening mechanism includes a first fastening component installed inside an audio device, a second fastening component installed inside the audio device and disposed on a side of the first fastening component, a speaker unit whereon a first fixing part and a second fixing part are formed, a first elastic component wedged in the first fixing part and fastened inside the first fastening component, and a second elastic component wedged in the second fixing part and fastened inside the second fastening component in a rotating manner after the first elastic component is fastened inside the first fastening component.

8 Claims, 7 Drawing Sheets

SPEAKER ASSEMBLY WITH ROTARY FASTENING MECHANISM

BACKGROUND OF THE INVENTION

1. Field of the Invention

The present invention relates to a speaker assembly with a rotary fastening mechanism, and more specifically, to a speaker assembly with rotary fastening mechanism for biaxially fixing a speaker unit.

2. Description of the Prior Art

A speaker unit is usually installed on a guide pin of a structural component on a housing of a notebook for reducing screws in conventional assembly. For example, please refer to FIG. 1 and FIG. 2. FIG. 1 is an exploded diagram of a speaker fastening mechanism 10 in the prior art, and FIG. 2 is an assembly diagram of the conventional speaker fastening mechanism 10 in the prior art. The speaker fastening mechanisms 10 are disposed on two sides of a casing 11 respectively. Each speaker fastening mechanism 10 includes a speaker unit 12, two rubber gaskets 14, and two guide pins 16. The two rubber gaskets 14 are sheathed on two sides of the speaker unit 12. The two guide pins 16 are disposed inside the casing 11 and connected to the two rubber gaskets 14 respectively for positioning the speaker unit 12. However, this conventional assembly needs precise tolerance between the rubber gasket 14 and the guide pin 16. The close connection between the rubber gasket 14 and the guide pin 16 causes the resonance due to the sound transmission. However, the loose connection between the rubber gasket 14 and the guide pin 16 makes the speaker unit 12 fall off easily to affect the assembly speed. In conclusion, it is an important issue to design a speaker fastening mechanism with convenient assembly and without affecting by assembly tolerance.

SUMMARY OF THE INVENTION

The present invention provides a speaker assembly with a rotary fastening mechanism for biaxially fixing a speaker unit to solve the problems mentioned above.

According to the claimed invention, a speaker fastening mechanism includes a first fastening component installed inside an audio device; a second fastening component installed inside the audio device and disposed on a side of the first fastening component; a speaker unit, whereon a first fixing part and a second fixing part are formed; a first elastic component wedged in the first fixing part and fastened inside the first fastening component; and a second elastic component wedged in the second fixing part and fastened inside the second fastening component in a rotating manner after the first elastic component is fastened inside the first fastening component.

According to the claimed invention, a first hole is formed on the first fastening component, a first breach is formed on a side of the first hole, a second hole is formed on the second fastening component, a second breach is formed on a side of the second hole, and a direction of the first breach is substantially perpendicular to a direction of the second breach.

According to the claimed invention, a protrusion is disposed on a side of the first breach of the first fastening component for constraining the first elastic component inside the first hole.

According to the claimed invention, a protrusion is disposed on a side of the second breach of the second fastening component for constraining the second elastic component inside the second hole.

According to the claimed invention, the first elastic component includes a first washer installed on a side of the first fixing part when the first elastic component wedges inside the first fixing part of the speaker unit; a first gasket for clamping the speaker unit with the first washer; and a second gasket for clamping the first fastening component with the first gasket.

According to the claimed invention, the first washer, the first gasket, and the second gasket are integrated monolithically.

According to the claimed invention, the second elastic component includes a second washer installed on a side of the second fixing part when the second elastic component wedges inside the second fixing part of the speaker unit; a third gasket for clamping the speaker unit with the second washer; and a fourth gasket for clamping the second fastening component with the third gasket.

According to the claimed invention, the second washer, the third gasket, and the fourth gasket are integrated monolithically.

According to the claimed invention, the first fixing part and the second fixing part are openings respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
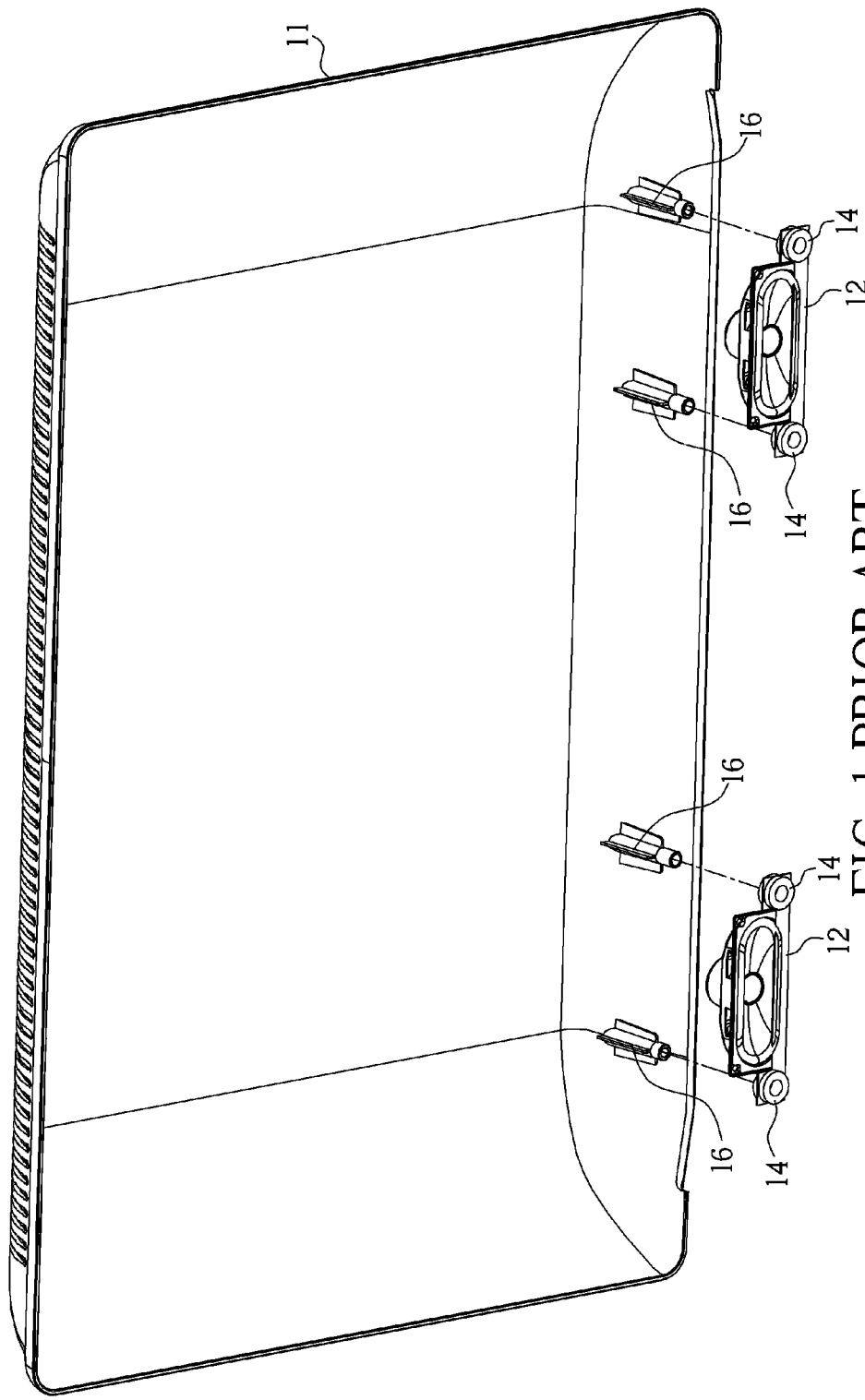
FIG. 1 is an exploded diagram of a speaker fastening mechanism in the prior art.
Figure 2:
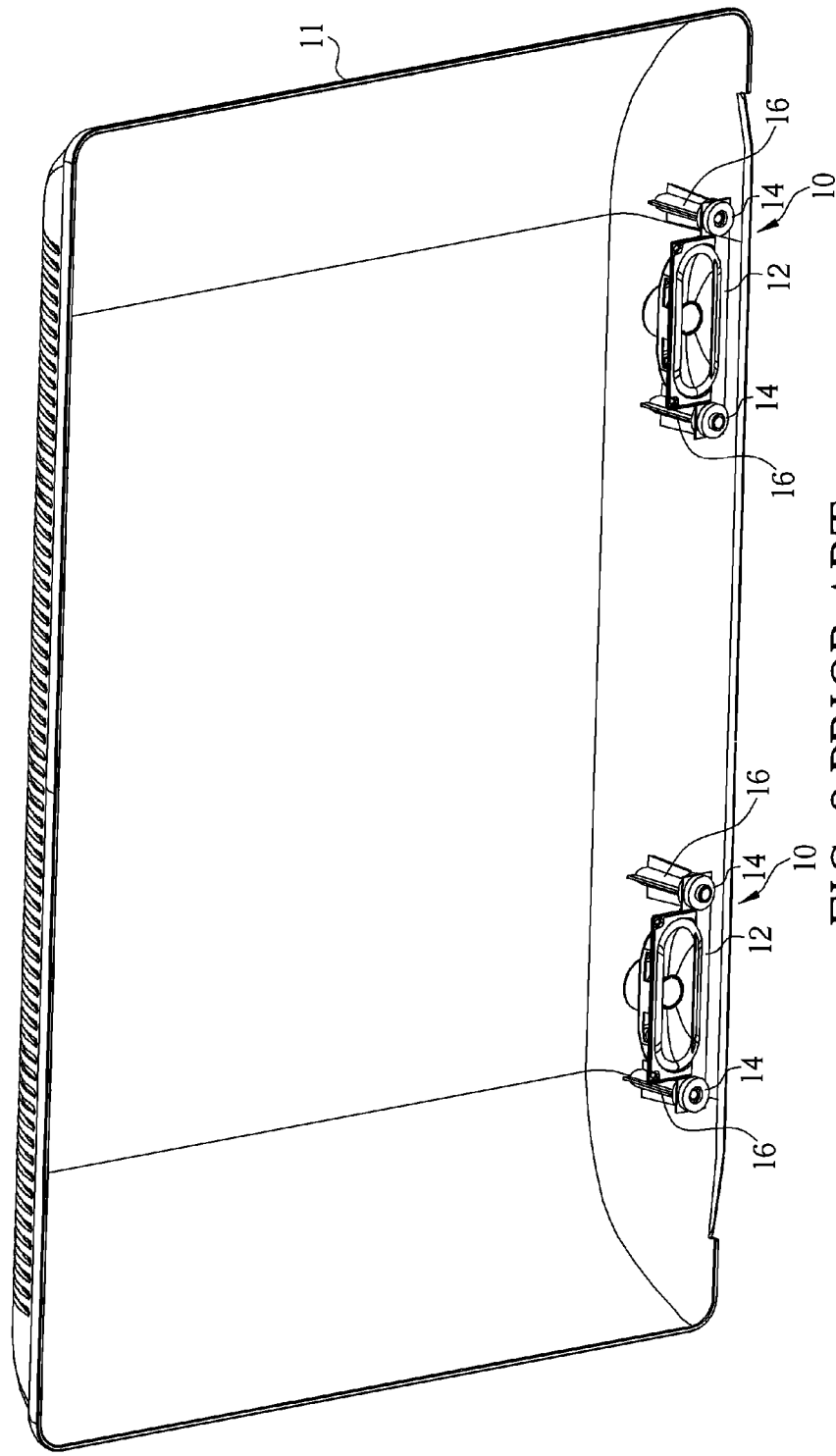
FIG. 2 is an assembly diagram of the speaker fastening mechanism in the prior art.
Figure 3:
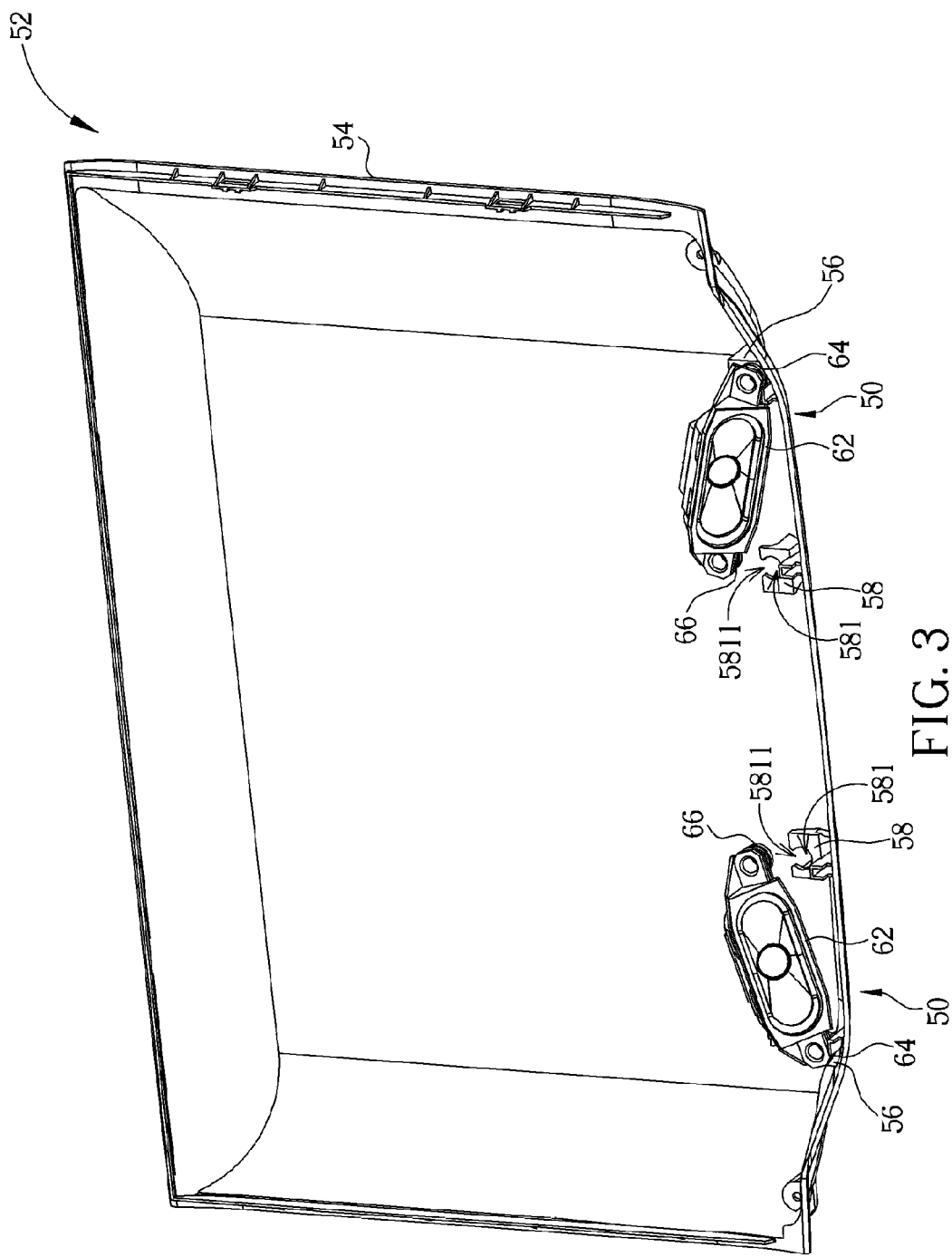
FIG. 3 and FIG. 4 are schematic diagrams of a speaker fastening mechanism in different states according to a preferred embodiment of the present invention.
Figure 4:
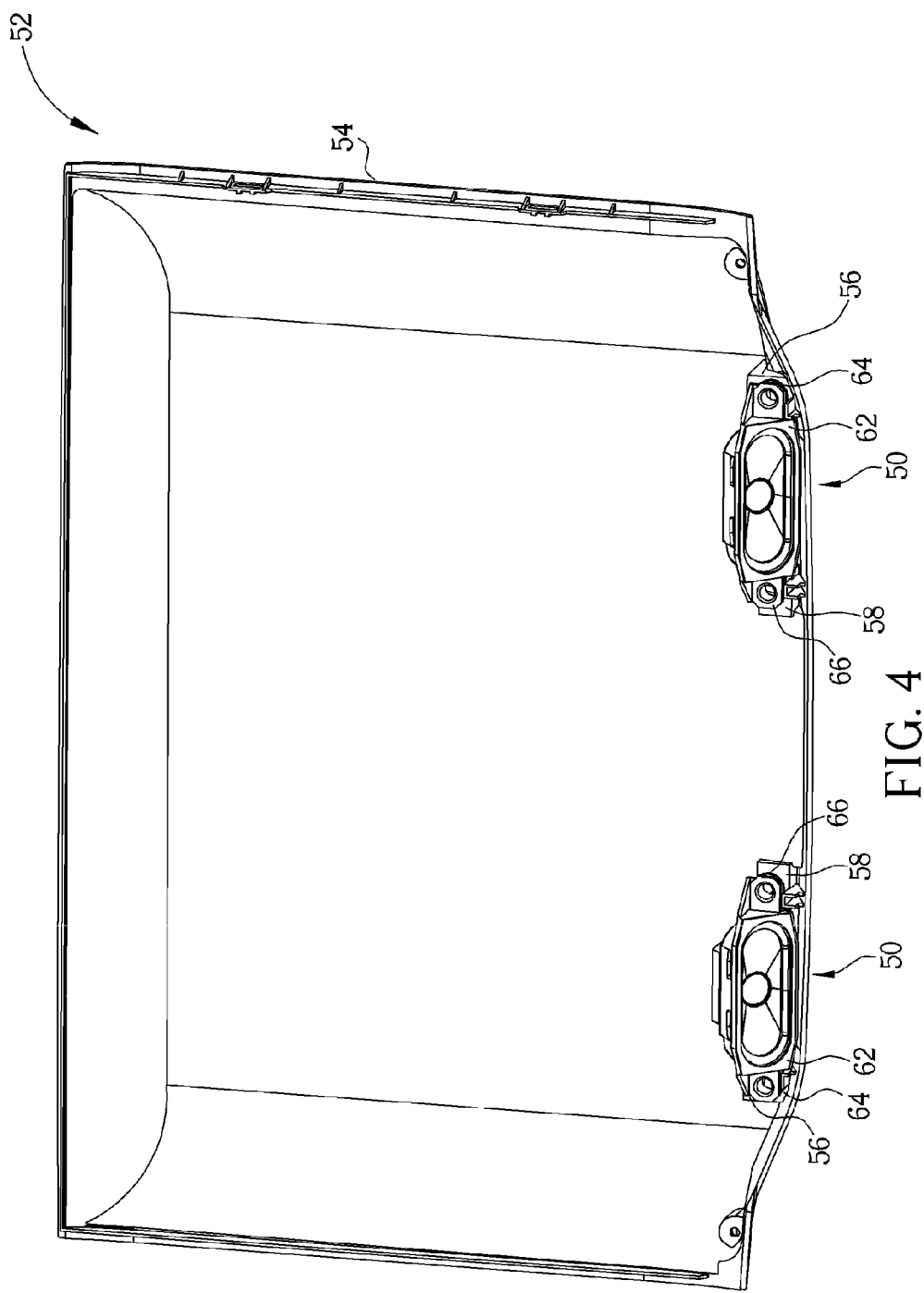
Figure 5:
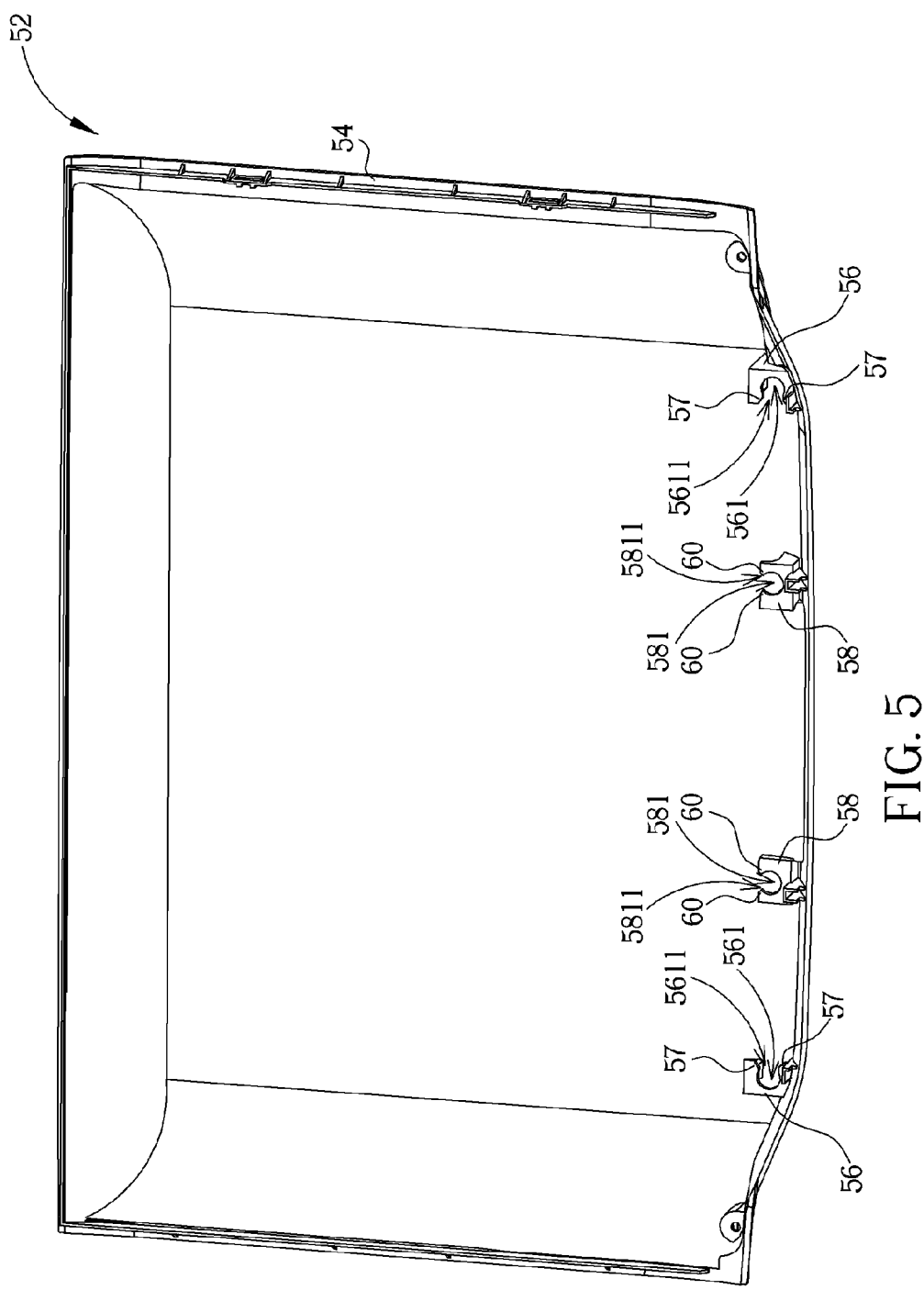
FIG. 5 is a perspective diagram of a casing of an audio device according to the preferred embodiment of the present invention.

Please refer to FIG. 3 and FIG. 4. FIG. 3 and FIG. 4 are schematic diagrams of a speaker fastening mechanism 50 in different states according to a preferred embodiment of the present invention. The speaker fastening mechanisms 50 are disposed on two sides inside a casing 54 of an audio device 52. The audio device 52 can be a LCD TV, a lap-top PC, and so on. Numbers and positions of the fastening mechanisms 50 installed inside the audio device 52 are not limited to the embodiment and depend on practical design demand. One of the fastening mechanisms 50 will be introduced in the following. Please refer to FIG. 5. FIG. 5 is a perspective diagram of the casing 54 of the audio device 52 according to the preferred embodiment of the present invention. The speaker fastening mechanism 50 includes a first fastening component 56 installed inside the casing 54. A first hole 561 is formed on the first fastening component 56, and a first breach 5611 is formed on a side of the first hole 561. Protrusions 57 are respectively disposed on two sides of the first breach 5611 of the first fastening component 56. The speaker fastening mechanism 50 further includes a second fastening component 58. The second fastening component 58 is installed inside the casing 54 and disposed on a side of the first fastening component 56. A second hole 581 is formed on the second fastening component 58, and a second breach 5811 is formed on a side of the second hole 581. Protrusions 60 are respectively disposed on two sides of the second breach 5811 of the second fastening component 58. Furthermore, a direction of the first breach 5611 can be substantially perpendicular to a direction of the second breach 5811. In other words, the structure of the first fastening component 56 and the structure of the second fastening component 58 can be identical, but the positioning direction of the first fastening component 56 and the positioning direction of the second fastening component 58 are different. Thus, design of an identical component is applied to reduce cost of manufacture and management.

Figure 6:
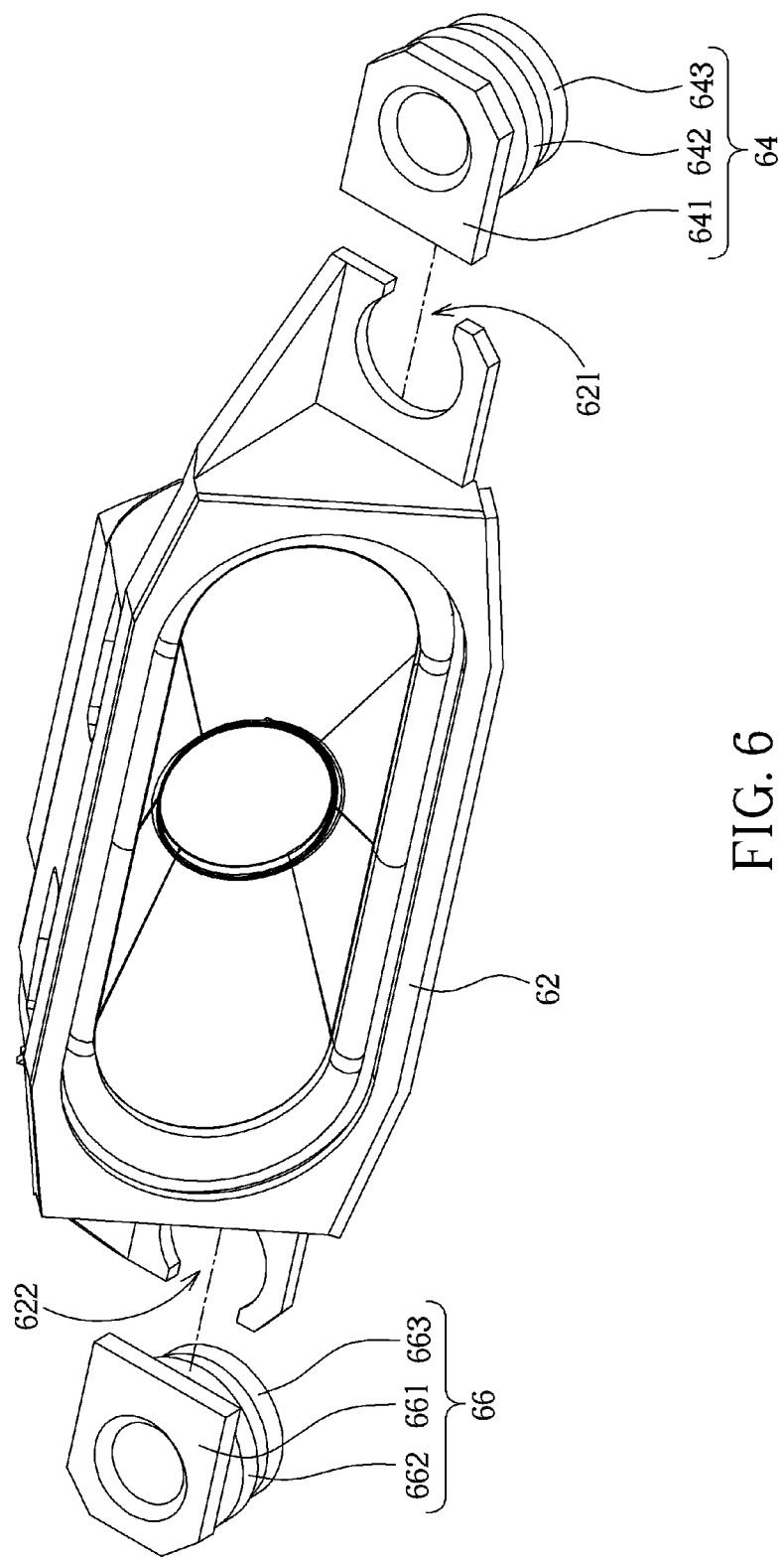
FIG. 6 is an exploded diagram of a speaker unit, a first elastic component, and a second elastic component according to the preferred embodiment of the present invention.
Figure 7:
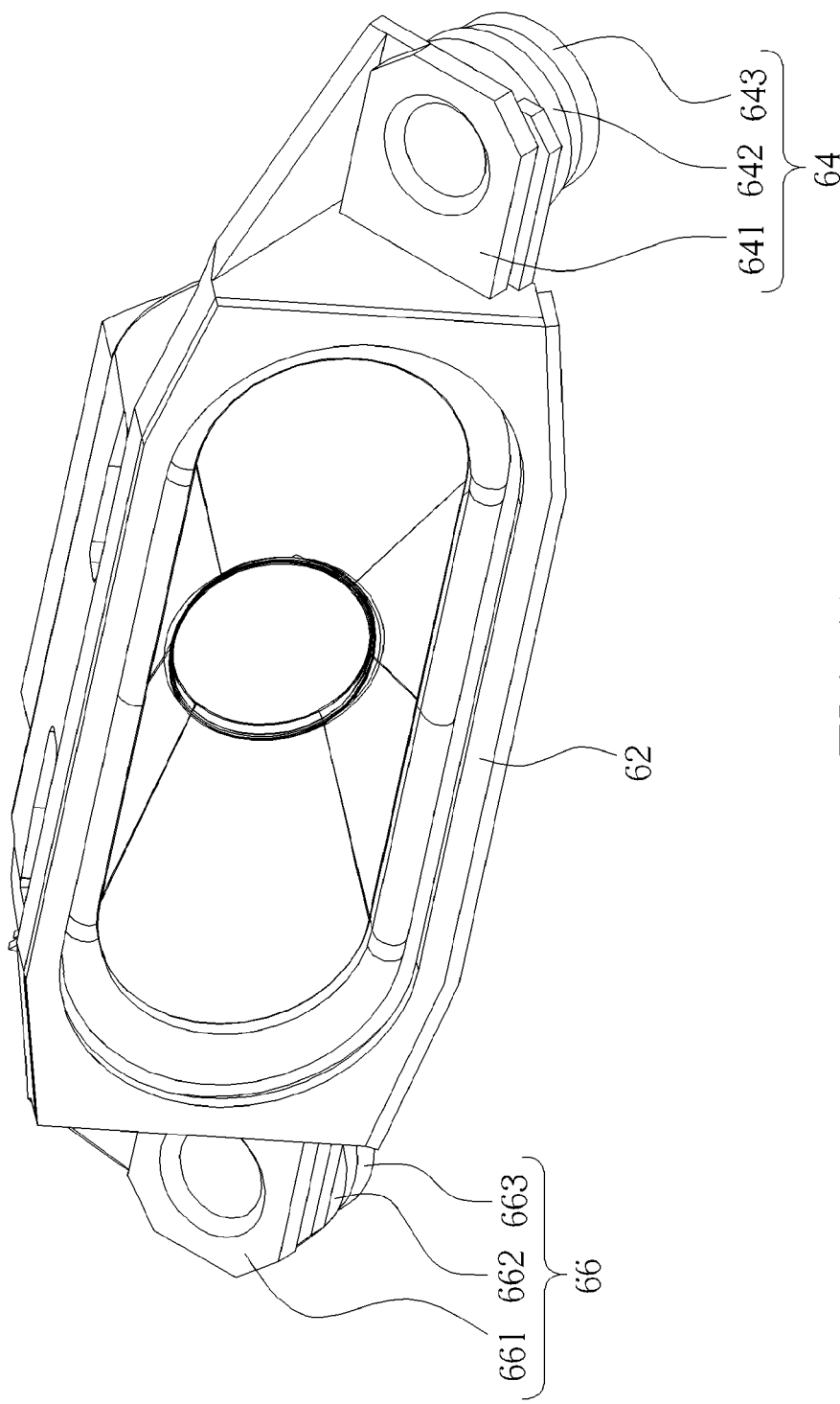
FIG. 7 is an assembly diagram of the speaker unit, the first elastic component, and the second elastic component according to the preferred embodiment of the present invention.

The speaker fastening mechanism 50 further includes a speaker unit 62, a first elastic component 64, and a second elastic component 66. Please refer to FIG. 6 and FIG. 7. FIG. 6 is an exploded diagram of the speaker unit 62, the first elastic component 64, and the second elastic component 66 according to the preferred embodiment of the present invention. FIG. 7 is an assembly diagram of the speaker unit 62, the first elastic component 64, and the second elastic component 66 according to the preferred embodiment of the present invention. The speaker unit 62 is for converting audio signals into sound waves. A first fixing part 621 and a second fixing part 622 are formed on the speaker unit 62. In this embodiment, the first fixing part 621 and the second fixing part 622 are openings respectively. The first elastic component 64 is wedged in the first fixing part 621 of the speaker unit 62 and fastened inside the first hole 561 of the first fastening component 56 through the first breach 5611. The first elastic component 64 includes a first washer 641 installed on a side of the first fixing part 621 when the first elastic component 64 is wedged inside the first fixing part 621 of the speaker unit 62. The first elastic component 64 further includes a first gasket 642 for clamping the speaker unit 62 with the first washer 641 when the first elastic component 64 is wedged inside the first fixing part 621 of the speaker unit 62. The first elastic component 64 further includes a second gasket 643 for clamping the first fastening component 56 with the first gasket 642 when the first elastic component 64 is wedged inside the first hole 561 of the first fastening component 56. Since the first elastic component 64 is made of resilient material, interference generated between the first elastic component 64 and the first fixing part 621 of the speaker unit 62 as well as the first breach 5611 of the first fastening component 56 causes elastic deformation of the first elastic component 64 when the first elastic component 64 is wedged inside the first fixing part 621 of the speaker unit 62 and fastened inside the first hole 561 of the first fastening component 56 through the first breach 5611, so as to fix the first elastic component 64 with the speaker unit 62 and the first fastening component 56 tightly. Besides, the protrusion 57 of the first fastening component 56 can contact against the first elastic component 64 to constrain the first elastic component 64 inside the first hole 561 when the first elastic component 64 is wedged inside the first hole 561 of the first fastening component 56, so as to avoid the first elastic component 64 from loosing or falling from the first breach 5611 while being turned over. Furthermore, the first elastic component 64 can be made of rubber material, and the first washer 641, the first gasket 642, and the second gasket 643 of the first elastic component 64 can be integrated monolithically.

The structure of the second elastic component 66 is identical to the first elastic component 64. The second elastic component 66 is wedged in the second fixing part 622 of the speaker unit 62 and fastened inside the second hole 581 of the second fastening component 58 through the second breach 5811. The second elastic component 66 includes a second washer 661 installed on a side of the second fixing part 622 when the second elastic component 66 is wedged inside the second fixing part 622 of the speaker unit 62. The second elastic component 66 further includes a third gasket 662 for clamping the speaker unit 62 with the second washer 661 when the second elastic component 66 is wedged inside the second fixing part 622 of the speaker unit 62. The second elastic component 66 further includes a fourth gasket 663 for clamping the second fastening component 58 with the third gasket 662 when the second elastic component 66 is wedged inside the second hole 581 of the second fastening component 58. Since the second elastic component 66 is made of resilient material, interference generated between the second elastic component 66 and the second fixing part 622 of the speaker unit 62 as well as the second breach 5811 of the second fastening component 58 causes elastic deformation of the second elastic component 66 when the second elastic component 66 is wedged inside the second fixing part 622 of the speaker unit 62 and fastened inside the second hole 581 of the second fastening component 58 through the second breach 5811, so as to fix the second elastic component 66 with the speaker unit 62 and the second fastening component 58 tightly. Besides, the protrusion 60 of the second fastening component 58 can contact against the second elastic component 66 to constrain the second elastic component 66 inside the second hole 581 when the second elastic component 66 is wedged inside the second hole 581 of the second fastening component 58, so as to avoid the second elastic component 66 from loosing or falling from the second breach 5811 while being turned over. Furthermore, the second elastic component 66 can be made of rubber material, and the second washer 661, the third gasket 662, and the fourth gasket 663 of the second elastic component 66 can be integrated monolithically.

The assembly process of the speaker fastening mechanism 50 is introduced as follows. First of all, the first elastic component 64 is wedged in the first fixing part 621 of the speaker unit 62 and the second elastic component 66 is wedged in the second fixing part 622 of the speaker unit 62. Afterwards, the first elastic component 64 is fastened inside the first hole 561 of the first fastening component 56 through the first breach 5611, and a side of the speaker unit 62 can be fixed to the first fastening component 56, as shown in FIG. 3. Then, the speaker unit 62 can be rotated so that the second elastic component 66 on a unfixed end of the speaker unit 62 rotates to be fastened inside the second hole 581 of the second fastening component 58 through the second breach 5811. As shown in FIG. 4, two ends of the speaker unit 62 are fixed to the first fastening component 56 and the second fastening component 58 respectively, and the assembly process of the speaker fastening mechanism 50 is finished. Since an end of the speaker unit 62 is fastened to the first fastening component 56 by the first elastic component 64 and then another end of the speaker unit 62 rotates to be fastened to the second fastening component 58 by the second elastic component 66, the speaker fastening mechanism 50 of the present invention can fasten the speaker unit 62 without screws. Furthermore, the direction of the first breach 5611 of the first fastening component 56 is not identical to the direction of the second breach 5811 of the second fastening component 58, for achieving biaxially constraining the speaker unit 62, so as to prevent the speaker unit 62 from loosing or falling, and to improve the assembly speed and yielding rate greatly.

In contrast to the prior art, the rotary speaker fastening mechanism of the present invention can fasten the speaker unit biaxially without screws. It has advantages of convenient assembly and without affecting by assembly tolerance so as to increase assembly efficiency of the speaker unit.

Those skilled in the art will readily observe that numerous modifications and alterations of the device and method may be made while retaining the teachings of the invention.

What is claimed is:

1. A speaker fastening mechanism comprising:
   a first fastening component having a first hole and a first breach formed on a side of the first hole, the first fastening component being installed inside an audio device;
   a second fastening component having a second hole and a second breach formed on a side of the second hole, a direction of the first breach being substantially perpendicular to a direction of the second breach, and the second fastening component being installed inside the audio device and disposed on a side of the first fastening component;
   a speaker unit, whereon a first fixing part and a second fixing part are formed;
   a first elastic component wedged in the first fixing part and fastened inside the first hole of the first fastening component; and
   a second elastic component wedged in the second fixing part and fastened inside the second hole of the second fastening component in a rotating manner after the first elastic component is fastened inside the first fastening component, for biaxially constraining the speaker unit with the first elastic component.

2. The speaker fastening mechanism of claim 1, wherein a protrusion is disposed on a side of the first breach of the first fastening component for constraining the first elastic component inside the first hole.

3. The speaker fastening mechanism of claim 1, wherein a protrusion is disposed on a side of the second breach of the second fastening component for constraining the second elastic component inside the second hole.

4. The speaker fastening mechanism of claim 1, wherein the first elastic component comprises:
   a first washer installed on a side of the first fixing part when the first elastic component wedges inside the first fixing part of the speaker unit;
   a first gasket for clamping the speaker unit with the first washer; and
   a second gasket for clamping the first fastening component with the first gasket.

5. The speaker fastening mechanism of claim 4, wherein the first washer, the first gasket, and the second gasket are integrated monolithically.

6. The speaker fastening mechanism of claim 1, wherein the second elastic component comprises:
   a second washer installed on a side of the second fixing part when the second elastic component wedges inside the second fixing part of the speaker unit;
   a third gasket for clamping the speaker unit with the second washer; and
   a fourth gasket for clamping the second fastening component with the third gasket.

7. The speaker fastening mechanism of claim 6, wherein the second washer, the third gasket, and the fourth gasket are integrated monolithically.

8. The speaker fastening mechanism of claim 1, wherein the first fixing part and the second fixing part are openings respectively.

* * * * *